US008123658B2

United States Patent
Asaoka (10) Patent No.: US 8,123,658 B2
(45) Date of Patent: Feb. 28, 2012

(54) CONTINUOUSLY VARIABLE TRANSMISSION, VEHICLE HAVING THE CONTINUOUSLY VARIABLE TRANSMISSION, AND CONTROL DEVICE AND CONTROL METHOD FOR THE CONTINUOUSLY VARIABLE TRANSMISSION

(75) Inventor: Ryousuke Asaoka, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 935 days.

(21) Appl. No.: 12/021,890

(22) Filed: Jan. 29, 2008

(65) Prior Publication Data
US 2008/0182713 A1 Jul. 31, 2008

(30) Foreign Application Priority Data
Jan. 31, 2007 (JP) .................................. 2007-021240

(51) Int. Cl.
*B60W 10/10* (2006.01)
(52) U.S. Cl. ........................................ 477/107; 477/906
(58) Field of Classification Search .................... 477/107
See application file for complete search history.

(56) References Cited

U.S. PATENT DOCUMENTS

| 5,993,338 A | 11/1999 | Kato et al. | |
|---|---|---|---|
| 7,374,510 B2 * | 5/2008 | Unno et al. | 477/44 |
| 2004/0116245 A1 * | 6/2004 | Yamamoto et al. | 477/46 |
| 2006/0073924 A1 * | 4/2006 | Izumi et al. | 474/28 |

FOREIGN PATENT DOCUMENTS

| EP | 1 645 785 A2 | 4/2006 |
|---|---|---|
| GB | 2 159 218 A | 11/1985 |
| JP | 62-108306 | 5/1987 |
| JP | 4-210156 | 7/1992 |
| JP | 08-023313 | 3/1996 |
| JP | 2001-282304 | 10/2001 |

* cited by examiner

*Primary Examiner* — Edwin A Young
(74) *Attorney, Agent, or Firm* — Rabin & Berdo, PC (57) ABSTRACT

Restriction of hunting in the gear ratio of an electronically-controlled continuously variable transmission (ECVT) for a vehicle. A gear ratio change mechanism has a crankshaft as an input shaft, an output shaft and a motor. The motor continuously varies the gear ratio between the crankshaft and the output shaft. An electronic control unit (ECU) performs feedback control of the gear ratio to achieve a target gear ratio. The ECU reduces an output of the motor when a hunting state of the gear ratio is detected.

18 Claims, 7 Drawing Sheets

CONTINUOUSLY VARIABLE TRANSMISSION, VEHICLE HAVING THE CONTINUOUSLY VARIABLE TRANSMISSION, AND CONTROL DEVICE AND CONTROL METHOD FOR THE CONTINUOUSLY VARIABLE TRANSMISSION

RELATED APPLICATIONS

This application claims the benefit of priority under 35 USC 119 of Japanese patent application no. 2007-021240, filed on Jan. 31, 2007, which application is hereby incorporated by reference in its entirety.

BACKGROUND OF THE INVENTION

1. Field of the Invention

The present invention relates to a continuously variable transmission (CVT) for a vehicle, and a control device and method for the CVT.

2. Description of Related Art

Conventionally, electronically-controlled continuously variable transmissions (ECVTs) have been known. ECVTs can adjust the gear ratio irrespective of engine speed and are widely used in vehicles such as scooters.

In an ECVT, in general, feedback control of the gear ratio between an input shaft and an output shaft is performed to achieve a target gear ratio. However, unintentional vibration above and below a target gear ratio ("hunting") may occur because of changes over time in characteristics of a slide mechanism of the ECVT, sensor output abnormalities, mismatches in control gain due to individual differences among ECVTs, and so forth. Such hunting in the gear ratio deteriorates drivability of the vehicle and places a large load on and deteriorates a gear ratio varying motor.

JP-B-Hei 8-23313 discloses a method to control a motor for driving an exhaust control valve, in which the motor is temporarily stopped when it has hunted a predetermined number of times. It is conceivable to apply this technique to the gear ratio varying motor of an ECVT.

However, the gear ratio may not be at the target gear ratio when the gear ratio varying motor of the ECVT is temporarily stopped after a predetermined number of huntings. That is, it may not be possible to achieve the target gear ratio. In addition, a load may be placed on the input and output shafts of the ECVT while the gear ratio control means is temporarily stopped, causing deviation from the target gear ratio. Thus, the technique of JP-B-Hei 8-23313 cannot suitably control an ECVT, even if hunting is suppressed to some degree.

SUMMARY OF THE INVENTION

The present invention addresses the foregoing problem and suppresses hunting in the gear ratio of an ECVT.

A transmission in accordance with the present invention includes a gear ratio change mechanism in which a motor continuously varies a gear ratio between an input shaft and an output shaft. A control section performs feedback control of the gear ratio to achieve a target gear ratio. The control section reduces the output of the motor when a hunting state of the gear ratio is detected.

A vehicle in accordance with the present invention includes the gear ratio change mechanism described above.

A control device in accordance with the present invention controls a transmission including a gear ratio change mechanism in which a motor continuously varies a gear ratio between an input shaft and an output shaft. The control device in accordance with the present invention performs feedback control of the gear ratio to achieve a target gear ratio. The control device reduces the output of the motor when a hunting state of the gear ratio is detected.

A control method in accordance with the present invention controls a transmission including a gear ratio change mechanism having a motor for continuously varying a gear ratio between an input shaft and an output shaft. The control method includes performing feedback control of the gear ratio to achieve a target gear ratio; detecting a hunting state of the gear ratio; and reducing the output of the motor when a hunting state of the gear ratio is detected.

The present invention suppresses hunting in the gear ratio of an ECVT.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIGS. 7(a)-7(g) are graphs for explaining detection of a hunting state of the gear ratio, wherein.

DETAILED DESCRIPTION OF THE INVENTION

Embodiment 1

Summary of the Embodiment

Figure 1:
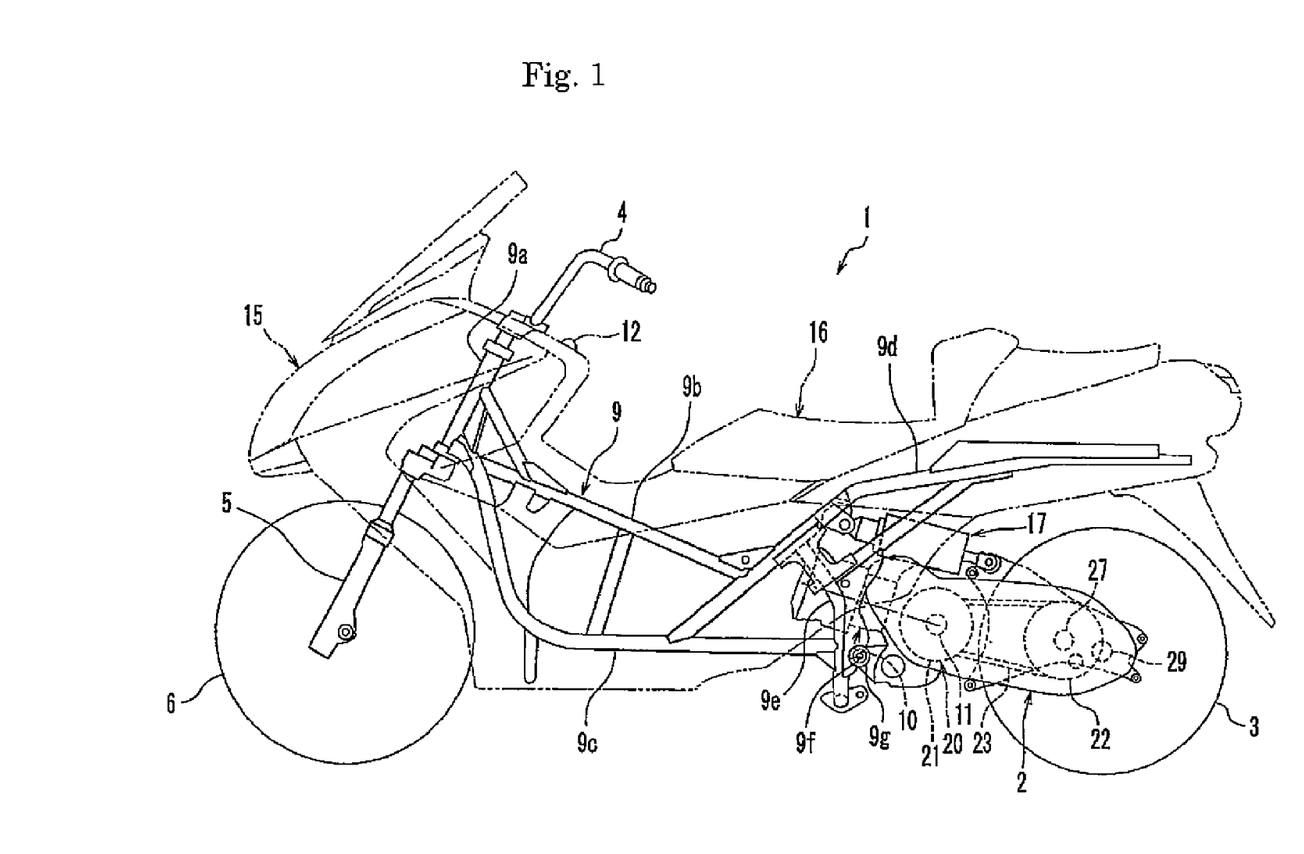
FIG. 1 is a side view of a two wheeled motorized vehicle to which the present invention is applied.

An embodiment of the present invention is now described with reference to a two wheeled motorized vehicle 1 shown in FIG. 1 as an example. While a scooter type vehicle is depicted in FIG. 1, the present invention is not limited to a scooter type vehicle. The vehicle may be, for example, a non-scooter type vehicle such as an off-road type, motorcycle type, scooter type, or moped type vehicle. In addition, the vehicle may be a straddle type vehicle other than a two wheeled motorized vehicle such as an all terrain vehicle (ATV) or the like. Further, the vehicle may be a vehicle other than a straddle type vehicle such as a four-wheeled vehicle.

Detailed Description of Two Wheeled Motorized Vehicle 1

FIG. 1 is a side view of two wheeled motorized vehicle 1. Vehicle 1 includes a body frame 9, an engine unit 2 as a driving source unit, a rear wheel 3 and a front wheel 6.

(Construction of Vehicle Body Frame 9)

Body frame 9 includes a head pipe 9a disposed at a front end, an upper tube 9b, a down tube 9c, a seat rail 9d and a vertical frame member 9e. Steering handlebars 4 are attached to an upper end of head pipe 9a and a front fork 5 is connected to a lower end of head pipe 9a. Front wheel 6 is rotatably attached to a distal end of front fork 5. Front wheel 6 is not connected to engine unit 2. In other words, front wheel 6 is a driven wheel.

Down tube 9c extends obliquely rearward and downward from head pipe 9a. Down tube 9c is bent at its intermediate portion to extend rearward and generally horizontally therefrom. Upper tube 9b extends obliquely rearward and downward above down tube 9c from the connection between head pipe 9a and down tube 9c. Seat rail 9d extends obliquely rearward and upward from a connection with the generally horizontal portion of down tube 9c. The lower end of upper tube 9b is connected to seat rail 9d. An intermediate portion of seat rail 9d is coupled to the rear end of down tube 9c via vertical frame member 9e.

A body cover 15 covers body frame 9. A seat 16 is attached to body cover 15. A caution lamp 12 is attached to body cover 15 at a position viewable by a rider riding on seat 16.

(Relationship Between Body Frame 9 and Engine Unit 2)

Figure 2:
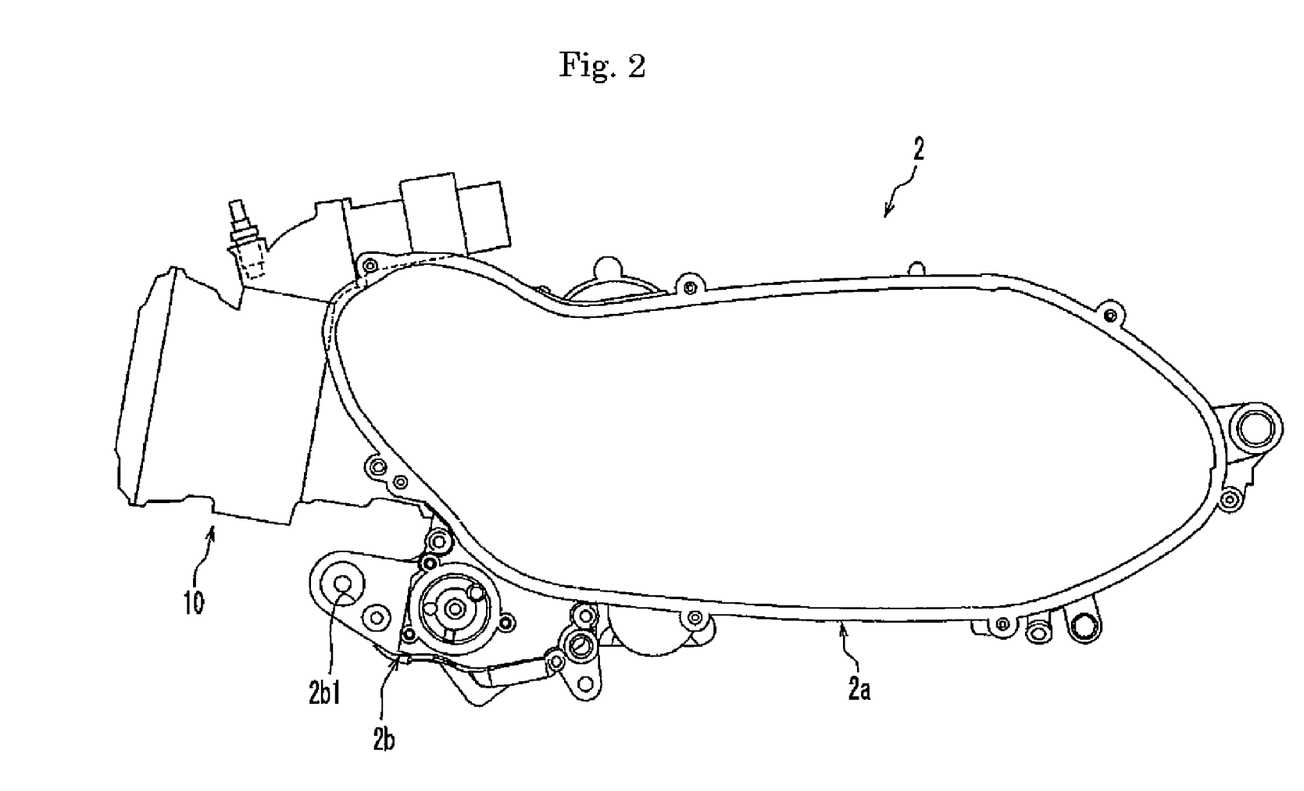
FIG. 2 is a partial cross sectional side view of an engine unit of the vehicle of FIG. 1

Engine unit 2 is directly attached to body frame 9 so as to be pivotable. As shown in FIG. 1, a pivot member 9f attached to vertical frame member 9e is formed in the shape of a cylinder and extends in the vehicle width direction. A pivot shaft 9g extending in the vehicle width direction is attached to pivot member 9f. As shown in FIG. 2, a pivot part 2b formed at a front and lower portion of a housing 2a of engine unit 2 is formed with a through hole 2b1 having generally the same inner diameter as that of pivot member 9f. Pivot shaft 9g is rotatably inserted into through hole 2b1.

As shown in FIG. 1, engine unit 2 is connected to an intermediate portion of seat rail 9d via a rear cushion unit 17. Rear cushion unit 17 suppresses oscillations of engine unit 2.

(Construction of Engine Unit 2)

The construction of engine unit 2 is now described with reference to FIG. 3.

—Construction of Engine 10—

Figure 3:
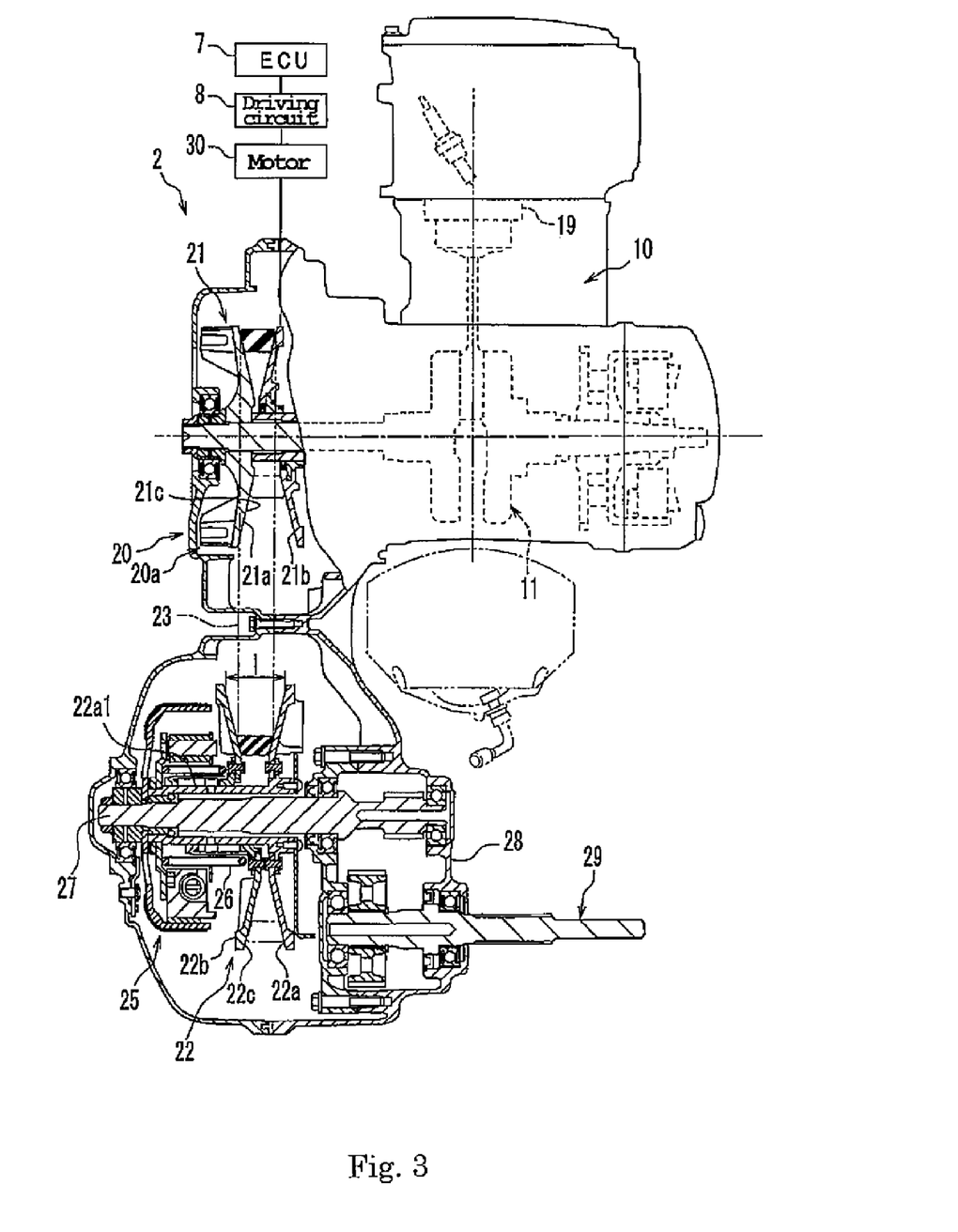
FIG. 3 is a partial cross sectional view of the engine unit.

As shown in FIG. 3, engine unit 2 includes an engine 10 and a transmission 20. While engine 10 is described as a 4-cycle forced-air-cooled engine, engine 10 may be another type of engine such as a water-cooled engine or a 2-cycle engine. A driving source other than an engine such as an electric motor may also be used. Thus, the present invention is not limited to a specific type of driving source.

Engine 10 includes a crankshaft 11 coupled to a piston 19.

—Construction of Transmission 20—

Transmission 20 comprises a gear ratio change mechanism 20a, an electronic control unit (ECU) 7 as a control section, and a driving circuit 8 as a motor driving section. Gear ratio change mechanism 20a is described as a belt type ECVT, however, it is not limited to a belt type ECVT and may be, for example, a toroidal type ECVT.

Gear ratio change mechanism 20a includes a primary sheave 21, a secondary sheave 22 and a V-belt 23. V-belt 23 is wound around primary sheave 21 and secondary sheave 22 and has a generally V-shaped cross section.

Primary sheave 21 rotates together with crankshaft 11 as an input shaft. Primary sheave 21 includes a fixed sheave half 21a fixed to one end of crankshaft 11 and a movable sheave half 21b opposed to fixed sheave half 21a and movable in the axial direction of crankshaft 11. Opposing surfaces of fixed sheave half 21a and movable sheave half 21b form a belt groove 21c for receiving V-belt 23. Belt groove 21c is wider toward the radially outer side of primary sheave 21.

The width of belt groove 21c is changed as a motor 30 drives movable sheave half 21b in the axial direction of crankshaft 11. In this embodiment, motor 30 is driven by pulse width modulation (PWM).

Secondary sheave 22 is disposed at the rear of primary sheave 21 and is attached to a driven shaft 27 via a centrifugal clutch 25. Secondary sheave 22 includes a fixed sheave half 22a, which has a cylindrical output shaft 22a1 formed integrally therewith, and a movable sheave half 22b. Fixed sheave half 22a is coupled to driven shaft 27 via centrifugal clutch 25. Movable sheave half 22b opposes fixed sheave half 22a and is movable in the axial direction of driven shaft 27. Opposing surfaces of fixed sheave half 22a and movable sheave half 22b form a belt groove 22c for receiving V-belt 23. Belt groove 22c is wider toward the radially outer side of secondary sheave 22.

Movable sheave half 22b is urged by a spring 26 in a direction of reducing the width of belt groove 22c. When motor 30 is driven to reduce the width of belt groove 21c and thus increases the winding diameter of V-belt 23 around primary sheave 21, V-belt 23 is pulled toward the radially inner side of secondary sheave 22. This causes movable sheave half 22b to move in a direction to increase the width of belt groove 22c against the urging force of spring 26. This in turn reduces the winding diameter of V-belt 23 around secondary sheave 22. As a result, the gear ratio of gear ratio change mechanism 20a is changed.

Centrifugal clutch 25 is engaged and disengaged according to the rotational speed of fixed sheave half 22a. When the rotational speed of fixed sheave half 22a is less than a predetermined rotational speed, centrifugal clutch 25 is not engaged and rotation of fixed sheave half 22a is not transmitted to driven shaft 27. On the other hand, when the rotational speed of fixed sheave half 22a is equal to or more than the predetermined rotational speed, centrifugal clutch 25 is engaged and rotation of fixed sheave half 22a is transmitted to driven shaft 27.

Driven shaft 27 is coupled to an axle 29 via a speed reduction mechanism 28. As shown in FIG. 1, rear wheel 3 is attached to axle 29 for rotation. Therefore, as driven shaft 27 rotates, axle 29 and rear wheel 3 rotate together.

<Control System of Vehicle 1>

A control system of vehicle 1 is now described with reference to FIG. 4.

(Outline of Control System of Two-Wheeled Motorized Vehicle 1)

Figure 4:
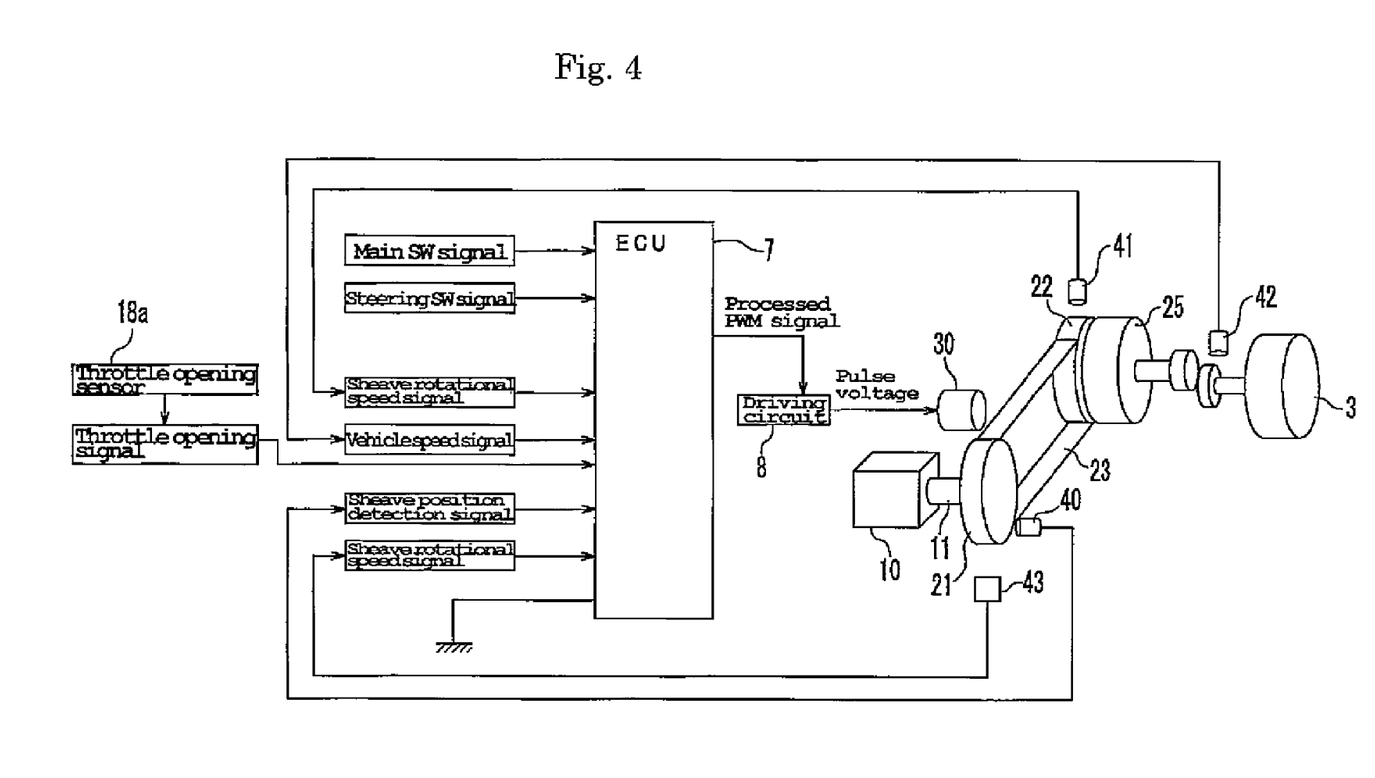
FIG. 4 is a block diagram illustrating a control system of the vehicle of FIG. 1.

As shown in FIG. 4, a sheave position sensor 40 connected to ECU 7 detects the position of movable sheave half 21b of primary sheave 21 relative to fixed sheave half 21a (hereinafter referred to as "sheave position"). In other words, sheave position sensor 40 detects a distance (l) between fixed sheave half 21a and movable sheave half 21b in the axial direction of crankshaft 11. Sheave position sensor 40 outputs to ECU 7 the detected distance (l) as a sheave position detection signal. Sheave position sensor 40 may be, for example, a potentiometer or the like.

A primary sheave rotational speed sensor 43, a secondary sheave rotational speed sensor 41 and a vehicle speed sensor 42 are connected to ECU 7. Primary sheave rotational speed sensor 43 detects the rotational speed of primary sheave 21 and outputs to ECU 7 the detected rotational speed of primary sheave 21 as a sheave rotational speed signal. Secondary sheave rotational speed sensor 41 detects the rotational speed of secondary sheave 22 and outputs to ECU 7 the detected rotational speed of secondary sheave 22 as a sheave rotational speed signal. Vehicle speed sensor 42 detects the rotational speed of rear wheel 3 and outputs to ECU 7 a vehicle speed signal based on the detected rotational speed.

A steering switch attached to steering handlebars 4 (FIG. 1) is connected to ECU 7 and outputs a steering SW signal when operated by a rider.

A throttle opening sensor 18a outputs a throttle opening signal to ECU 7.

(Control of Gear Ratio Change Mechanism 20a)

ECU 7 performs feedback control of the position of movable sheave half 21b of primary sheave 21 based on the vehicle speed signal and so forth. In other words, ECU 7 performs feedback control of the distance (l) based on the vehicle speed signal and so forth.

Figure 5:
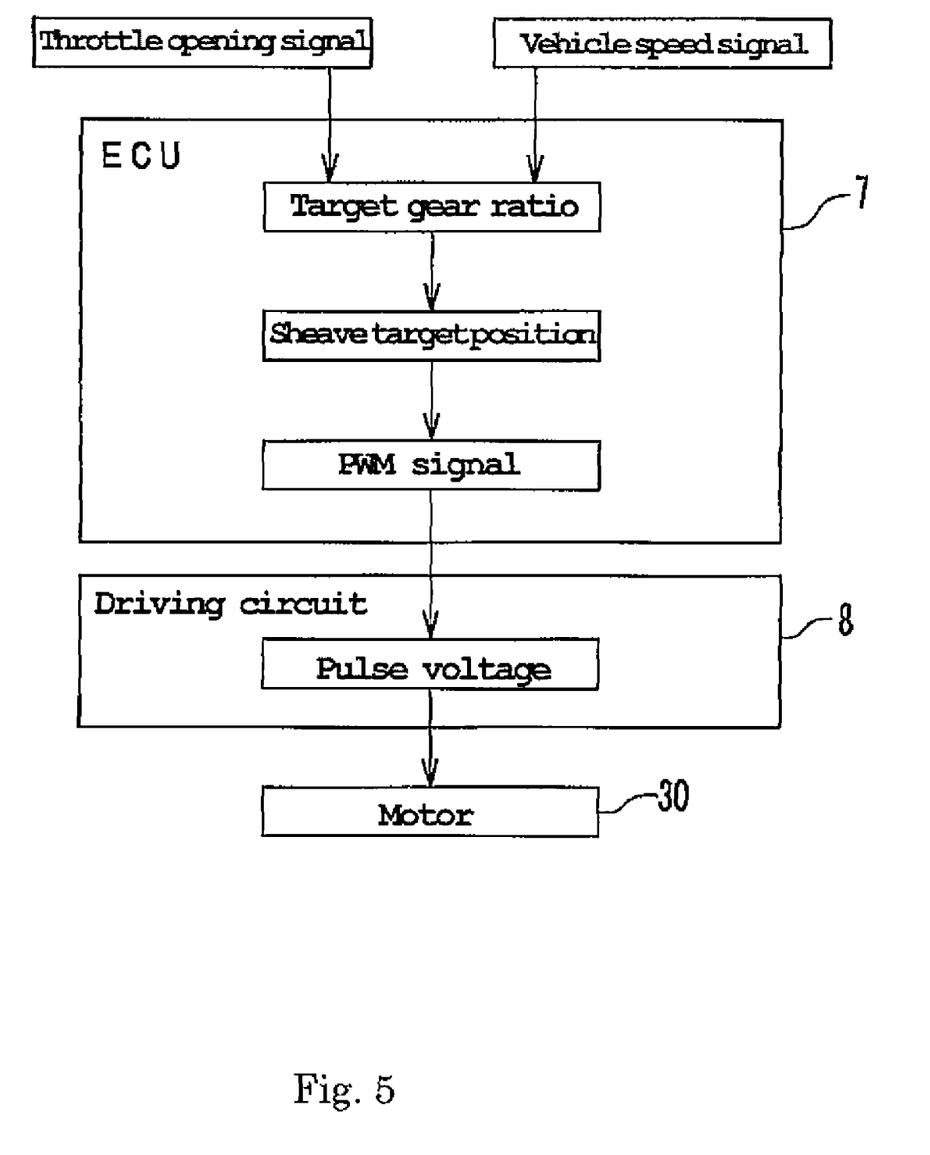
FIG. 5 is a block diagram illustrating sheave position control according to the invention.

Specifically, as shown in FIG. 5, ECU 7 determines a target gear ratio based on the throttle opening and vehicle speed. ECU 7 then calculates a sheave target position based on the determined target gear ratio. In other words, ECU 7 calculates a target distance (l) between movable sheave half 21b and fixed sheave half 21a based on the determined target gear ratio. ECU 7 outputs to driving circuit 8 a pulse width modulation (PWM) signal in accordance with the current position of movable sheave half 21b and the sheave target position. As shown in FIG. 5, driving circuit 8 applies to motor 30 a pulse voltage in accordance with the pulse width modulation signal. This drives movable sheave half 21b to adjust the gear ratio of transmission 20.

—Control to Suppress Hunting in Gear Ratio—

Figure 6:
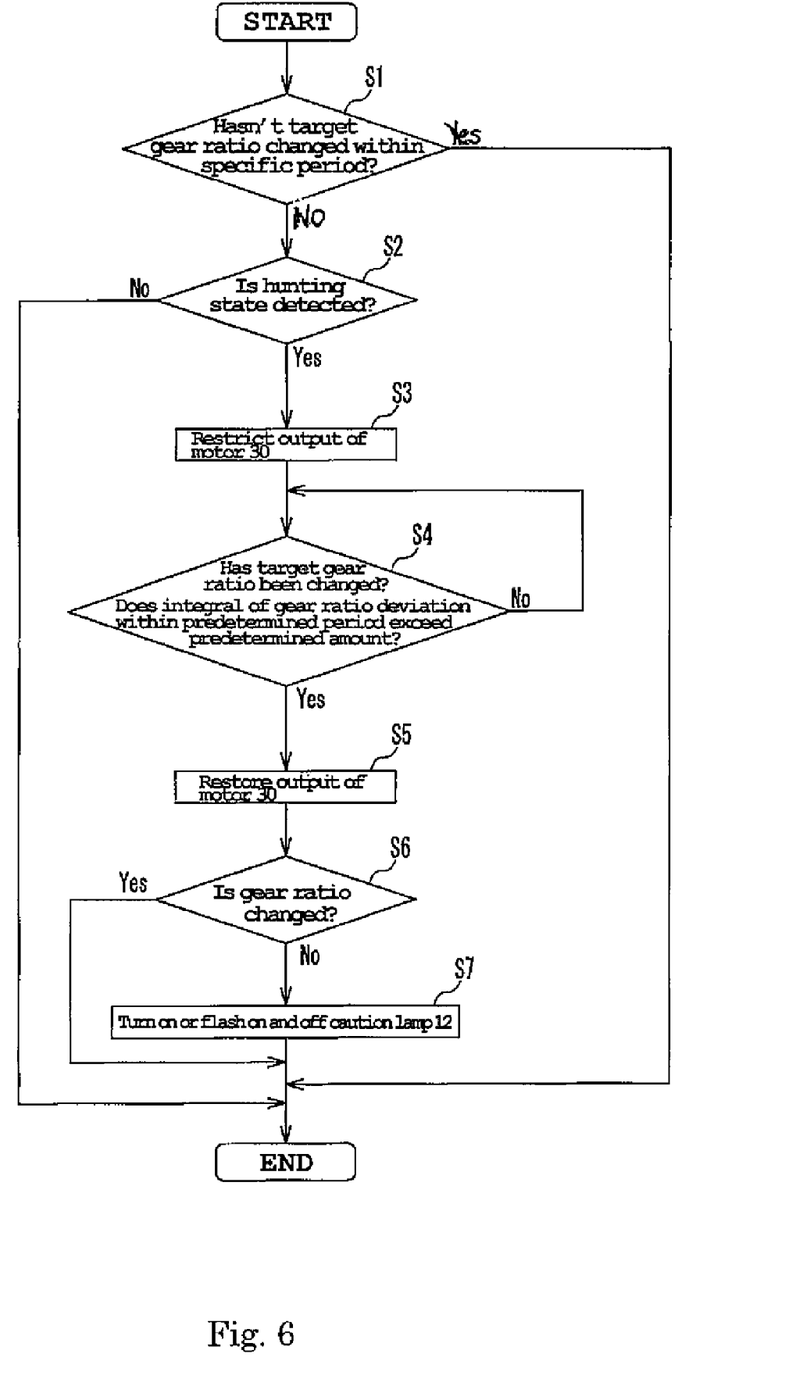
FIG. 6 is a block diagram illustrating control to restrict hunting in the gear ratio according to the invention.

The control to suppress hunting in the gear ratio is now described with reference to FIG. 6. In step S1, it is determined whether the target gear ratio of transmission 20 has been changed within a specific period. The specific period is set appropriately depending on the type or like of vehicle 1. For example, the specific period may be set in a range of about 100 msec to 1000 msec. In one embodiment, the specific period is set to about 500 msec.

If the target gear ratio of transmission 20 has not been changed within the specific period, the process proceeds to step S2. In step S2, detection of a hunting state of the gear ratio of transmission 20 is performed.

If a hunting state is detected in step S2, the output of motor 30 is restricted in step S3. The method to restrict the output of motor 30 is not specifically limited. Where motor 30 is controlled by PWM, as in this embodiment, the upper limit of the duty ratio of the pulse voltage applied to motor 30 may be reduced to reduce the upper limit of the output of motor 30. For example, the output of motor 30 may be reduced by restricting the duty ratio of the pulse voltage applied to motor 30 to 0-30%, in contrast with 0-100% before restriction. The output of motor 30 may alternatively be reduced by reducing the duty ratio of the pulse voltage applied to motor 30 by a specific proportion.

Where motor 30 is controlled by pulse amplitude modulation (PAM), the output of motor 30 may be reduced by reducing the upper limit of the magnitude of the pulse voltage applied to motor 30. The output of motor 30 may alternatively be reduced by reducing the magnitude of the pulse voltage applied to motor 30 by a specific proportion.

After the output of motor 30 is restricted in step S3, it is determined in step S4 whether the target gear ratio of transmission 20 has been changed, and whether the integral of the deviation between the target gear ratio and the actual gear ratio (hereinafter referred to as "gear ratio deviation") over a predetermined period exceeds a predetermined amount. If the target gear ratio has been changed, or if the integral of the gear ratio deviation over the predetermined period exceeds the predetermined amount, in step S5, the output of motor 30 is restored to that before restriction in step S3.

After the output of motor 30 is restored in step S5, it is determined in step S6 whether the gear ratio is changed. If the gear ratio is not changed, an abnormality of gear ratio change mechanism 20a is detected and caution lamp 12 is turned on or flashed on and off in step S7.

The "predetermined period" and the "predetermined amount" in step S4 may each be set appropriately depending on the type or like of vehicle 1. In one embodiment, the "predetermined period" is set to 10 seconds.

"Method to Detect Hunting State"

Figure 7:
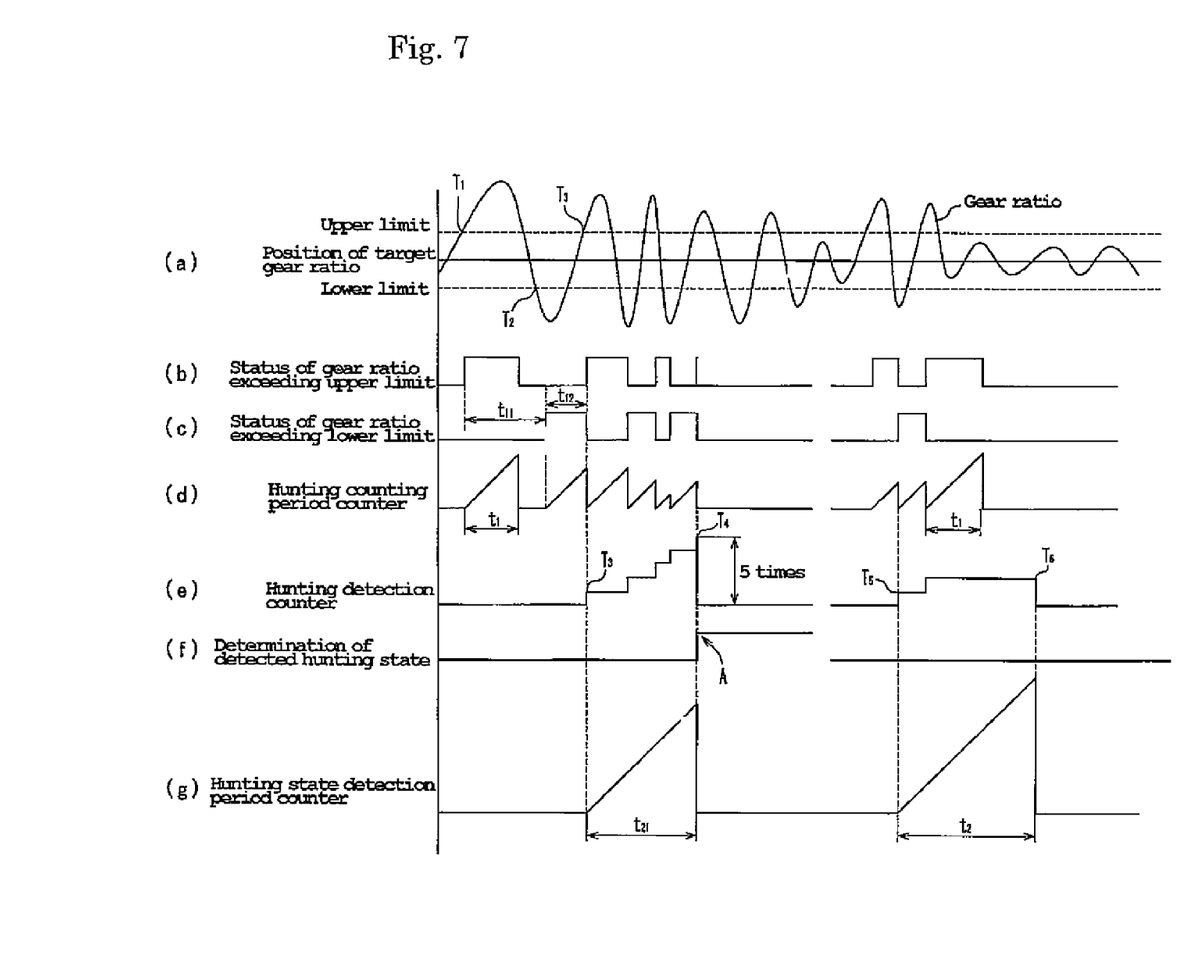
FIG. 7(a) shows changes in the gear ratio.
FIG. 7(b) shows periods when the gear ratio exceeds an upper limit of the tolerable gear ratio range.
FIG. 7(c) shows periods when the gear ratio exceeds the lower limit of the tolerable gear ratio range.
FIG. 7(d) shows hunting counting periods.
FIG. 7(e) shows the number of hunting detections during hunting state detection periods.
FIG. 7(f) shows determination of a detected hunting state.
FIG. 7(g) shows a hunting state detection period counter.

The method to detect a hunting state in step S2 is now described with reference to FIG. 7. The hunting state detection method described herein is merely one example to which the present invention is not limited.

In step S2, the count of huntings in the gear ratio is incremented when the gear ratio exceeds either the upper or lower limit of a gear ratio range including the target gear ratio (hereinafter referred to as "tolerable gear ratio range") and thereafter exceeds the other of the upper and lower limits of the tolerable gear ratio range within a predetermined hunting counting period $t_1$. The predetermined hunting counting period $t_1$ is set appropriately depending on the type or like of vehicle 1. In one embodiment, the predetermined hunting counting period $t_1$ is set to 20 msec.

When the count of huntings within a predetermined hunting state detection period $t_2$ is incremented to a predetermined number or more, it is determined that the gear ratio is in a hunting state and the process proceeds to step S3. The predetermined hunting state detection period $t_2$ may be set appropriately depending on the type or like of vehicle 1. In one embodiment, the predetermined hunting state detection period $t_2$ is set to 50 msec. The predetermined number of the count is also set appropriately depending on the type or like of vehicle 1. In this embodiment, the predetermined number is set to 2 or more, and may be set to 5, for example.

The example shown in FIGS. 7(a)-(g) is now described. As shown in FIG. 7(a), after exceeding the upper limit of the tolerable gear ratio range at time $T_1$, the gear ratio exceeds the lower limit of the tolerable gear ratio range at time $T_2$. Period $t_{11}$ between time $T_1$ and time $T_2$ shown in FIG. 7(b) is more than predetermined hunting counting period $t_1$ shown in FIG. 7(d). Therefore, the variation in the gear ratio during period $t_{11}$ is not counted as hunting.

On the other hand, period $t_{12}$ from time $T_2$ when the gear ratio exceeds the lower limit of the tolerable gear ratio range to time $T_3$ when the gear ratio exceeds the upper limit of the tolerable gear ratio range is not more than predetermined hunting counting period $t_1$ shown in FIG. 7(d). Therefore, the variation in the gear ratio during period $t_{12}$ is counted as one hunting as shown in FIG. 7(e). Then, when the count of huntings in predetermined hunting state detection period $t_2$ shown in FIG. 7(g) reaches the predetermined number (in this embodiment, 5), it is determined that the gear ratio is in a hunting state. Specifically, since period $t_{21}$ from time $T_3$ when a first hunting is counted to time $T_4$ when a fifth hunting is counted is not more than predetermined hunting state detection period $t_2$, it is determined at timing A shown in FIG. 7(f) that the gear ratio is in a hunting state. On the other hand, only two huntings are counted during a period from time $T_5$ when a first hunting is counted to time $T_6$ when predetermined hunting state detection period $t_2$ has elapsed after time $T_5$. Therefore, it is not determined that the gear ratio is in a hunting state during the period from time $T_5$ to time $T_6$.

<Function and Effect>

As has been described above, the output of motor 30 is reduced when the gear ratio is in a hunting state. Therefore, the amplitude of the gear ratio is reduced. As a result, a relatively small load is placed on motor 30 when the motor is switched from forward to reverse rotation and from reverse to forward rotation. Hence, deterioration of motor 30 is suppressed and its service life is extended. Further, suppressed hunting in the gear ratio improves the drivability of vehicle 1.

In addition, since motor 30 is not stopped in this embodiment, the gear ratio is prevented from deviating from the target gear ratio even after a hunting state of the gear ratio is detected and the output of motor 30 is restricted. From this point of view, the output of motor 30 after the restriction is preferably large enough to suppress changes in the gear ratio.

The output of motor 30 is not suppressed where only either the upper or lower limit of the tolerable gear ratio range is exceeded within hunting state detection period $t_2$, or where only one hunting has occurred within predetermined hunting state detection period $t_2$. Reducing the output of motor 30 in such cases would slow down the tracking speed of the gear ratio to the target gear ratio where the target gear ratio has been changed, and thus is not preferable. Instead, in this embodiment, the gear ratio is determined to be in a hunting state only if a hunting state is detected a plurality of times within the hunting state detection period $t_2$. Therefore, the tracking speed of the gear ratio to the target gear ratio is kept relatively where the target gear ratio has been changed, while hunting in the gear ratio is suppressed.

In addition, in this embodiment, variations in the gear ratio over such a relatively long period that the gear ratio does not exceed both the upper and lower limits of the tolerable gear ratio range within the hunting counting period $t_1$ are not counted as hunting. In this way, high drivability, effective reduction of the load placed on motor 30 and a high tracking speed of the gear ratio to the target gear ratio are achieved.

Variations in the gear ratio over a long period do not affect drivability very much and do not place a very large load on motor 30. Therefore, it is less necessary to suppress variations in the gear ratio over a long period since it does not significantly improve drivability or reduce the load placed on motor 30. Reducing the output of motor 30 to suppress variations in the gear ratio over a long period reduces the tracking speed of the gear ratio where the target gear ratio has been changed, and thus is not preferable. High drivability, effective reduction of the load placed on motor 30 and a high tracking speed of the gear ratio to the target gear ratio are thereby achieved by not counting variations in the gear ratio over a relatively long period as hunting, as in this embodiment.

In this embodiment, the output of motor 30 is restored where the target gear ratio is changed in steps S4 and S5. Therefore, the tracking speed of the gear ratio to the target gear ratio is kept relatively high.

Where the integral of the gear ratio deviation within a predetermined period exceeds a predetermined amount, an abnormality that gear ratio change mechanism 20a is fixed or the like may occur. In such a case, it may not be possible to change the gear ratio. Therefore, restoring the output of motor 30 when the integral of the deviation between the target gear ratio and the gear ratio exceeds a predetermined amount can apply a large torque to gear ratio change mechanism 20a to unfix gear ratio change mechanism 20a.

In addition, an abnormality of gear ratio change mechanism 20a can be detected by detecting in step S6 whether or not the gear ratio is changed when the output of motor 30 is restored, for example.

Where the integral of the gear ratio deviation within a predetermined period exceeds a predetermined amount, for example, it is highly possible that the gear ratio remains constant rather than becoming closer to the target gear ratio. The cause of a constant gear ratio distant from the target gear ratio might be that the output of motor 30 is restricted to too low a level to displace movable sheave half 21b, or that movable sheave half 21b is substantially fixed to crankshaft 11 or the like. Where the output of motor 30 is restricted to too low a level to displace movable sheave half 21b, for example, the gear ratio is changed when the output of motor 30 is restored in step S5. On the other hand, in the case of an abnormality that movable sheave half 21b is fixed to crankshaft 11 or the like, the gear ratio is not changed even when the output of motor 30 is restored in step S5. Thus, an abnormality of gear ratio change mechanism 20a can be detected by determining in step S6 whether or not the gear ratio is changed when the output of motor 30 is restored. The state where "movable sheave half 21b is substantially fixed" includes the case where resistance to displacement of movable sheave half 21b is so high that movement of movable sheave half 21b is difficult, in addition to the case where movable sheave half 21b cannot be displaced.

If an abnormality of gear ratio change mechanism 20a is detected, caution lamp 12 is turned on or flashed on and off in step S7. This immediately notifies the rider of the abnormality of gear ratio change mechanism 20a.

In this embodiment, motor 30 is controlled by PWM. Therefore, power loss in motor 30 is relatively small compared to a case where motor 30 is controlled by PAM, for example.

<<Other Modifications>>

While a scooter type vehicle 1 has been described as one embodiment of the invention, the present invention is not limited to a scooter type vehicle. The vehicle may be, for example, a non-scooter type vehicle such as an off-road type, motorcycle type, scooter type, or moped type vehicle. In addition, the vehicle may be a straddle type vehicle other than a two wheeled motorized vehicle such as an all terrain vehicle (ATV) or the like. Further, the vehicle may be a vehicle other than a straddle type vehicle such as a four-wheeled vehicle.

Gear ratio change mechanism 20a is not limited to a belt type ECVT and may be, for example, a toroidal type ECVT. Because hunting tends to occur particularly in belt type ECVTs because of fluttering of V-belt 23, the present invention is especially effective for belt type ECVTs.

Step S4 may only determine whether the target gear ratio has been changed, so that the process proceeds to step S5 only when the target gear ratio has been changed. In other words, the determination of whether the integral of the deviation in the sheave position over a predetermined period exceeds a predetermined amount may be omitted in step S4.

DEFINITIONS OF TERMS IN THE SPECIFICATION

The term "hunting state" refers to a state where two or more huntings occur continuously.

The term "driving source" refers to a device that generates power. The "driving source" may be, for example, an internal combustion engine, an electric motor or the like.

The present invention is effectively applicable to ECVTs.

While particular embodiments of the invention have been described, it should be understood that these embodiments are exemplary, and not restrictive. Various modifications will be apparent to those of skill in the art and are within the scope of the present invention as set forth in the following claims.

The invention claimed is
1. A transmission comprising:
a gear ratio change mechanism having a motor for continuously varying a gear ratio between an input shaft and an output shaft; and
a control section for performing feedback control of the gear ratio to achieve a target gear ratio, and reducing an output of the motor when a hunting state of the gear ratio is detected.

2. The transmission according to claim 1, wherein the control section reduces the output of the motor by reducing an upper limit of the output of the motor.

3. The transmission according to claim 1, wherein the control section:
increments a count of huntings when the gear ratio, after exceeded either an upper or lower limit of a tolerable gear ratio range including the target gear ratio, exceeds the other of the upper and lower limits of the tolerable gear ratio range within a predetermined hunting detection period; and
detects a hunting state of the gear ratio when the count of huntings reaches a predetermined number within a predetermined hunting counting period.

4. The transmission according to claim 3, wherein the predetermined number is 2 or more.

5. The transmission according to claim 1, wherein after reducing the output of the motor, the control section restores the output of the motor when the target gear ratio is changed.

6. The transmission according to claim 5, wherein after reducing the output of the motor and while the target gear ratio is not changed, the control section restores the output of the motor when an integral of a difference between the target gear ratio and an actual gear ratio of the gear ratio change mechanism over a predetermined period exceeds a predetermined amount.

7. The transmission according to claim 6, wherein the control section detects any change in the gear ratio when the output of the motor is restored, and detects any abnormality where no change in the gear ratio is detected.

8. The transmission according to claim 1, wherein the control section reduces the output of the motor by performing pulse width modulation control to reduce a duty ratio of a voltage applied to the motor.

9. The transmission according to claim 1, wherein the gear ratio change mechanism further comprises:
a primary sheave attached to the input shaft;
a secondary sheave attached to the output shaft; and
a belt wound around the primary sheave and the secondary sheave.

10. A vehicle comprising the transmission according to claim 1.

11. A control device for a transmission comprising
a gear ratio change mechanism having a motor for continuously varying a gear ratio between an input shaft and an output shaft,
wherein the control device performs feedback control of the gear ratio to achieve a target gear ratio, and reduces an output of the motor when a hunting state of the gear ratio is detected.

12. A control method for a transmission comprising a gear ratio change mechanism having a motor for continuously varying a gear ratio between an input shaft and an output shaft, the control method comprising:
performing feedback control of the gear ratio to achieve a target gear ratio;
detecting a hunting state of the gear ratio; and
reducing an output of the motor when a hunting state of the gear ratio is detected.

13. The control method according to claim 12, wherein the output of the motor is reduced by reducing an upper limit of the output of the motor.

14. The control method according to claim 12, wherein the step of detecting a hunting state of the gear ratio comprises:
incrementing a count of huntings when the gear ratio, after exceeding either an upper or lower limit of a tolerable gear ratio range including the target gear ratio, exceeds the other of the upper and lower limits of the tolerable gear ratio range within a predetermined hunting detection period; and
detecting the hunting state when the count reaches a predetermined number within a predetermined hunting counting period.

15. The control method according to claim 12, further comprising:
after reducing the output of the motor, restoring the output of the motor when the target gear ratio is changed.

16. The control method according to claim 15, further comprising:
after reducing the output of the motor and while the target gear ratio is not changed, restoring the output of the motor when an integral of a difference between the target gear ratio and an actual gear ratio of the gear ratio change mechanism over a predetermined period exceeds a predetermined amount.

17. The control method according to claim 16, further comprising:
detecting any change in the gear ratio when the output of the motor is restored; and
detecting any abnormality where no change in the gear ratio is detected.

18. The control method according to claim 12, wherein the output of the motor is reduced by performing pulse width modulation control to reduce a duty ratio of a voltage applied to the motor.

* * * * *